United States Patent
Ni et al.

(10) Patent No.: US 10,609,548 B2
(45) Date of Patent: Mar. 31, 2020

(54) USER TERMINAL, AND METHOD AND DEVICE FOR PROVIDING MOBILE COMMUNICATION SERVICE

(71) Applicant: SPREADTRUM COMMUNICATIONS (SHANGHAI) CO., LTD., Zhangjiang, Shanghai (CN)

(72) Inventors: Jinjin Ni, Shanghai (CN); Xianliang Chen, Shanghai (CN); Xichun Gao, Shanghai (CN); Yi He, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 42 days.

(21) Appl. No.: 15/800,572

(22) Filed: Nov. 1, 2017

(65) Prior Publication Data
US 2018/0160293 A1    Jun. 7, 2018

(30) Foreign Application Priority Data
Dec. 6, 2016 (CN) .......................... 2016 1 1114191

(51) Int. Cl.
  *H04W 8/18* (2009.01)
  *H04W 84/12* (2009.01)
  *H04W 84/04* (2009.01)

(52) U.S. Cl.
  CPC .......... *H04W 8/183* (2013.01); *H04W 84/042* (2013.01); *H04W 84/12* (2013.01)

(58) Field of Classification Search
  CPC .... H04W 8/183; H04W 84/042; H04W 84/12
  See application file for complete search history.

(56) References Cited

U.S. PATENT DOCUMENTS

| | | | | |
|---|---|---|---|---|
| 2010/0159954 | A1* | 6/2010 | Rahman | H04W 8/02 455/456.3 |
| 2012/0178500 | A1* | 7/2012 | Hwang | H04W 8/183 455/558 |
| 2013/0064176 | A1* | 3/2013 | Hsu | H04W 36/14 370/328 |
| 2013/0102313 | A1* | 4/2013 | Tinnakornsrisuphap | H04W 36/22 455/436 |

(Continued)

OTHER PUBLICATIONS

Google scholar search.*

*Primary Examiner* — Qun Shen
(74) *Attorney, Agent, or Firm* — Cantor Colburn LLP

(57) ABSTRACT

User terminal, and method and device for providing mobile communication service are provided. The method includes: a first subscriber card providing service through a first network, and a second subscriber card providing service through a second network; detecting that the first network currently supports providing a first type of service for a plurality of subscriber cards at the same time; notifying other subscriber card except the first subscriber card to allow the other subscriber card to provide the first type of service through the first network; detecting that the second subscriber card needs to provide the first type of service; and if performance of the second subscriber card providing the first type of service through the first network is better than performance of providing the first type of service through the second network, controlling the second subscriber card to provide the first type of service through the first network.

15 Claims, 2 Drawing Sheets

(56) References Cited

U.S. PATENT DOCUMENTS

| | | | |
|---|---|---|---|
| 2014/0177591 A1* | 6/2014 | Dhanda | H04W 36/0022 370/331 |
| 2014/0357268 A1* | 12/2014 | Dubey | H04W 48/16 455/434 |
| 2016/0278139 A1* | 9/2016 | Lei | H04W 28/08 |

* cited by examiner

USER TERMINAL, AND METHOD AND DEVICE FOR PROVIDING MOBILE COMMUNICATION SERVICE

CROSS-REFERENCE TO RELATED APPLICATIONS

This application claims the benefit of priority under 35 U.S.C. § 119 to Chinese patent application No. 201611114191.X, filed on Dec. 6, 2016, and the entire disclosure of which is incorporated herein by reference.

TECHNICAL FIELD

The present disclosure generally relates to radio communication technology field, and more particularly, to a user terminal, and method and device for providing mobile communication service.

BACKGROUND

A user terminal can support simultaneous use of multiple user cards (such as SIM card, USIM card, etc.), and the multiple user cards can work either in a same mode or in different modes. This kind of user terminal is called multi-card multi-mode user terminal.

User terminals always access a network through a mobile communication network. With the rapid development of mobile communication technology, user terminals can access a network through networks other than the mobile communication network. For example, user terminals may access the network through a WiFi network and provide WiFi-based telephony service, i.e., Voice over WiFi (Vo-WiFi) service. Hereinafter, "networks other than the mobile communication network" are referred to as "other networks".

User terminals may provide service in different networks through different ways. The same type of service can be implemented in different ways to achieve different performance. For example, voice service can be implemented in a number of different ways. A network working based on an LTE protocol provides voice service through Voice over LTE (VoLTE), which leads to better performance than providing voice service through a way in 2G mode.

Performance of service provided by accessing a network through a mobile communication network is always superior to performance of service provided by accessing a network through other networks. For example, when an LTE network is accessed, voice service is provided through VoLTE; and when a WiFi network is accessed, voice service is provided through VoWiFi, where performance of the former is usually better than that of the latter. However, to the way of accessing a network through a mobile communication network, the performance may be affected by factors, such as signal strength (not limited to signal strength). For example, when the user terminal is located in a remote mountainous area which has relatively narrow mobile communication coverage, service performance of the way of accessing a network through a mobile communication network may be relatively poor. Therefore, in such environment where mobile communication coverage is relatively narrow, service provided by accessing the network through the mobile communication network may have worse performance than similar service provided by accessing the network through other networks.

SUMMARY

In embodiments of the present disclosure, a multi-card multi-mode user terminal may provide service with better performance nearly without an increase in cost.

In an embodiment of the present disclosure, a method for providing mobile communication service is provided, including: a first subscriber card providing service through a first network, and a second subscriber card providing service through a second network, where the first network operates based on a protocol of a mobile communication network and the second network operates based on a protocol of other network, or the first network operates based on a protocol of the other network and the second network operates based on a protocol of the mobile communication network; detecting that the first network currently supports providing a first type of service for a plurality of subscriber cards at the same time; notifying other subscriber card except the first subscriber card to allow the other subscriber card to provide the first type of service through the first network; detecting that the second subscriber card needs to provide the first type of service; and if performance of the second subscriber card providing the first type of service through the first network is better than performance of the second subscriber card providing the first type of service through the second network, or if the second subscriber card is currently unable to provide the first type of service through the second network, controlling the second subscriber card to provide the first type of service through the first network.

Optionally, after the second subscriber card provides the first type of service through the first network, the method may further include: detecting that the first network currently does not support providing the first type of service for a plurality of subscriber cards at the same time; and controlling the second subscriber card to provide the first type of service through the second network.

Optionally, after allowing the other subscriber card to provide the first type of service through the first network, the method may further include: detecting that the first network currently does not support providing the first type of service for a plurality of subscriber cards at the same time; and notifying the other subscriber card except the first subscriber card to forbid the other subscriber card to provide the first type of service through the first network.

Optionally, a user terminal may support simultaneous use of at least two subscriber cards.

Optionally, the first type of service may be voice service or video service.

Optionally, the first network operates based on a protocol of LTE network and the second network operates based on a protocol of WiFi network, or the first network operates based on a protocol of WiFi network and the second network operates based on a protocol of LTE network.

In an embodiment of the present disclosure, a device for providing mobile communication service is provided, including a first detecting circuitry, a notifying circuitry, a second detecting circuitry, a determining circuitry and a switching circuitry, wherein a first subscriber card provides service through a first network, and a second subscriber card provides service through a second network, where the first network operates based on a protocol of a mobile communication network and the second network operates based on a protocol of other network, or the first network operates based on a protocol of the other network and the second network operates based on a protocol of the mobile communication network, wherein the first detecting circuitry is configured to detect whether the first network currently supports providing a first type of service for a plurality of subscriber cards at the same time; the notifying circuitry is configured to: if the first detecting circuitry detects that the first network currently supports providing the first type of service for a plurality of subscriber cards at the same time, notify other subscriber card except the first subscriber card to allow the other subscriber card to provide the first type of service through the first network; the second detecting circuitry is configured to detect whether the second subscriber card needs to provide the first type of service; the determining circuitry is configured to: after the second detecting circuitry detects that the second subscriber card needs to provide the first type of service, determine whether performance of the second subscriber card providing the first type of service through the first network is better than performance of the second subscriber card providing the first type of service through the second network, or whether the second subscriber card is unable to provide the first type of service through the second network; and the switching circuitry is configured to: after the determining circuitry determines that the performance of the second subscriber card providing the first type of service through the first network is better than the performance of the second subscriber card providing the first type of service through the second network, or that the second subscriber card is unable to provide the first type of service through the second network, control the second subscriber card to provide the first type of service through the first network.

Optionally, the switching circuitry may be further configured to: if the first detecting circuitry detects that the first network currently does not support providing the first type of service for a plurality of subscriber cards at the same time, control the second subscriber card to provide the first type of service through the second network.

Optionally, the notifying circuitry may be further configured to: if the first detecting circuitry detects that the first network currently does not support providing the first type of service for a plurality of subscriber cards at the same time, notify the other subscriber card except the first subscriber card to forbid the other subscriber card to provide the first type of service through the first network.

Optionally, a user terminal may support simultaneous use of at least two subscriber cards.

Optionally, the first type of service may be voice service or video service.

Optionally, the first network may operates based on a protocol of LTE network and the second network may operate based on a protocol of WiFi network, or the first network may operate based on a protocol of WiFi network and the second network may operate based on a protocol of LTE network.

In an embodiment of the present disclosure, a user terminal which supports simultaneous use of at least two subscriber cards is provided, including the above device for providing mobile communication service.

Embodiments of the present disclosure may provide following advantages. If it is detected that the first network currently supports providing a first type of service for a plurality of subscriber cards at the same time, other subscriber card except the first subscriber card is notified to allow the other subscriber card to provide the first type of service through the first network. If other subscriber card (such as the second subscriber card) needs to provide the first type of service subsequently, and performance of the second subscriber card providing the first type of service through the first network is better than performance of the second subscriber card providing the first type of service through the second network, the second subscriber card is controlled to provide the first type of service through the first network. In this way, better service may be provided to the other subscriber card nearly without increase in cost. Particularly in situations where signal quality of mobile communication network varies continuously, and each subscriber card switches between the mobile communication network and the other network, the method may provide service to users with relatively good performance.

Further, if it is detected that the first network currently does not support providing the first type of service for a plurality of subscriber cards at the same time, the second subscriber card is controlled to provide the first type of service through the second network, and/or the other subscriber card except the first subscriber card is notified to forbid the other subscriber card to provide the first type of service through the first network, so as to avoid influence on normal use for the first subscriber card corresponding to the first network caused by borrowing of the first network by the other subscriber card.

DETAILED DESCRIPTION

Figure 1:
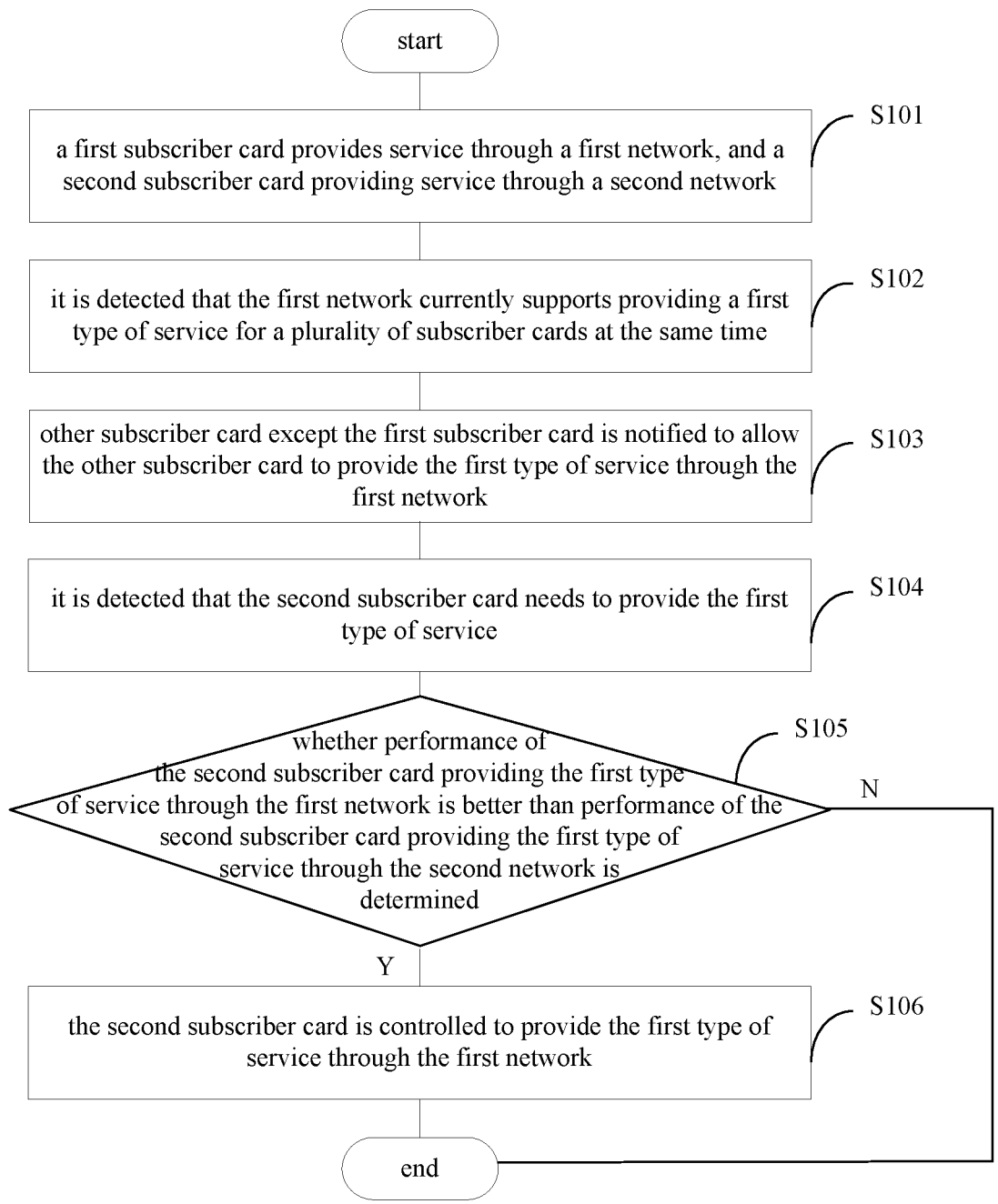
FIG. 1 schematically illustrates a flow chart of a method for providing mobile communication service according to an embodiment.

As described in the background, in existing techniques, performance of service provided by accessing a network through a mobile communication network is always superior to performance of service provided by accessing a network through other networks. For example, when an LTE network is accessed, voice service is provided through VoLTE; and when a WiFi network is accessed, voice service is provided through VoWiFi, where performance of the former is usually better than that of the latter.

Inventors found that the performance of service provided through the mobile communication network varies continuously, for example, at different time points or in different places. The performance of service provided through the mobile communication network is superior to performance of service provided through other networks sometimes, while being worse than the performance of service provided through other networks in other times.

Latest mobile communication technology (may not be public) enables multi-cards (which provide service through different networks in an initial state) to provide a particular type of service through a same network at the same time. For example, a first subscriber card and a second subscriber card provide voice service through a first network at the same time, and use of the first network by the second subscriber card does not affect normal use for the first subscriber card (assuming that the first subscriber card corresponds to the first network in an initial state).

In embodiments of the present disclosure, if it is detected that a first network currently supports providing a first type of service for a plurality of subscriber cards at the same time, other subscriber card except the first subscriber card is notified to allow the other subscriber card to provide the first type of service through the first network. If the other subscriber card (such as a second subscriber card) needs to provide the first type of service subsequently, and performance of the second subscriber card providing the first type of service through the first network is better than performance of the second subscriber card providing the first type of service through the second network, the second subscriber card is controlled to provide the first type of service through the first network. In this way, better service may be provided to the other subscriber card nearly without increase in cost. Particularly in situations where signal quality of mobile communication network varies continuously, and each subscriber card switches between the mobile communication network and the other network, the method may provide service to users with relatively good performance.

In order to clarify the object, solutions and advantages of embodiments of the present disclosure, embodiments of present disclosure will be described clearly in detail in conjunction with accompanying drawings.

In an embodiment of the present disclosure, a method for providing mobile communication service is provided.

In some embodiments, the method is adapted for a multi-card user terminal which supports simultaneous use of at least two subscriber cards. In an initial state, at least one subscriber card provides service through a network based on a protocol of mobile communication network, and at least one subscriber card provides service through a network based on a protocol of other network. For example, in an initial state, one subscriber card provides service through a network based on an LTE protocol, and another subscriber card provides service through a network based on a protocol of WiFi network. This is only an example, and it is also possible that "borrowing" exists in other combinations of various networks.

FIG. 1 schematically illustrates a flow chart of a method for providing mobile communication service according to an embodiment. The method may include S101 to S106 and is described in detail below.

In S101, a first subscriber card provides service through a first network, and a second subscriber card providing service through a second network.

It should be noted that, expression of "the first subscriber card" and "the second subscriber card" are used to distinguish two different subscriber cards, but not meaning that the two subscriber cards have an order in logic. Expression of "the first network" and "the second network" is used for similar purpose.

In an initial state, each subscriber card provides service through its corresponding network. That is, the first subscriber card provides service through the first network, and the second subscriber card provides service through the second network. If there are three or more subscriber cards, a third subscriber card and a fourth subscriber card also provide service through their corresponding networks, respectively.

Among the networks, at least one network operates based on a protocol of mobile communication network, and at least one network operates based on a protocol of other network. Specifically, the first network may operate based on the protocol of mobile communication network and the second network may operate based on the protocol of other network, or the first network operates based on the protocol of the other network and the second network operates based on the protocol of mobile communication network.

In S102, it is detected that the first network currently supports providing a first type of service for a plurality of subscriber cards at the same time.

Some of the networks support providing some types of service for a plurality of subscriber cards at the same time. For example, in some advanced chips for mobile phone, the network based on an LTE protocol may support providing voice service for a plurality of subscriber cards at the same time.

It could be understood that, not all the networks can support providing service for a plurality of subscriber cards at the same time and the network also does not support providing all types of service for a plurality of subscriber cards at the same time. This depends on a current state of the subscriber card corresponding to the network, and content of the protocol on which the network is based.

In some embodiments, during a procedure when each subscriber card provides service through its corresponding network (which is defined as "initial state"), whether each network currently supports providing a particular type of service for a plurality of subscriber cards at the same time is detected.

The detection result may be one or more network among the various networks corresponding to the subscriber cards can currently provide one or more type of service for a plurality of subscriber cards at the same time. In embodiments of the present disclosure, the network currently supporting providing service for a plurality of subscriber cards at the same time is called the first network, and the subscriber card which, in an initial state, corresponds to the network currently supporting providing service for a plurality of subscriber cards at the same time is called the first subscriber card. The service the network currently supports providing for a plurality of subscriber cards at the same time may be one or more type. In embodiments of the present disclosure, the service the network currently supports providing for a plurality of subscriber cards at the same time is called the first type of service.

For example, if a network based on a protocol of mobile communication network currently supports providing service for a plurality of subscriber cards at the same time, the network may serve as the first network. If a network based on a protocol of other network supports providing service for a plurality of subscriber cards at the same time, the network may serve as the first network. If there are three networks based on a same protocol or different protocols currently support providing service for a plurality of subscriber cards at the same time, the three networks (in three different "borrowing" procedures) may serve as the first network respectively.

In S103, other subscriber card except the first subscriber card is notified to allow the other subscriber card to provide the first type of service through the first network.

If it is detected that a particular network currently supports providing a particular type of service for a plurality of subscriber cards at the same time, other subscriber card except the subscriber card corresponding to the particular network is notified to allow the other subscriber card to provide the particular type of service through the particular network. After receiving the notification, the other subscriber card, if needing to provide the particular type of service subsequently, may provide the particular type of service through the particular network.

After allowing the other subscriber card to provide the first type of service through the first network, it is further detected (in a particular period) whether the first network currently supports providing a particular type of service for a plurality of subscriber cards at the same time. If it is detected that the first network currently does not support providing the first type of service for a plurality of subscriber cards at the same time, the other subscriber card except the first subscriber card is notified to forbid the other subscriber card to provide the first type of service through the first network.

By the above solutions, if it is detected that the first network currently does not support providing the first type of service for a plurality of subscriber cards at the same time, the second subscriber card is controlled to provide the first type of service through the second network, and/or the other subscriber card except the first subscriber card is notified to forbid the other subscriber card to provide the first type of service through the first network, so as to avoid influence on normal use for the first subscriber card corresponding to the first network caused by borrowing of the first network by the other subscriber card.

In S104, it is detected that the second subscriber card needs to provide the first type of service.

In some embodiments, after a network corresponding to a particular subscriber card sends the notification to the other subscriber card in S103, a subscriber card which needs to provide the particular type of service subsequently among the other subscriber card is called the second subscriber card, and a network corresponding to the second subscriber card in the initial state is called the second network. In practice, according to practical situations, the second subscriber card may be one or more subscriber card among the other subscriber card. That is, there may be one subscriber card borrowing the first network corresponding to the first subscriber card to provide the first type of service, or there may be a plurality of subscriber cards borrowing the first network corresponding to the first subscriber card at the same time to provide the first type of service.

It should be noted that, "the first subscriber card" and "the second subscriber card" are defined with "a borrowed member" and "a borrowing member" in the "borrowing" procedure. One subscriber card may serve as "the first subscriber card" in one "borrowing" procedure, and serve as "the second subscriber card" in another "borrowing" procedure. "The first network" and "the second network" can be understood similarly.

In S105, whether performance of the second subscriber card providing the first type of service through the first network is better than performance of the second subscriber card providing the first type of service through the second network is determined.

In some embodiments, a situation that the second subscriber card is unable to provide the first type of service through the second network may belong to the situation that performance of the second subscriber card providing the first type of service through the first network is better than performance of the second subscriber card providing the first type of service through the second network.

If the performance of the second subscriber card providing the first type of service through the first network is better than the performance of the second subscriber card providing the first type of service through the second network, S106 is performed; or else, no processing is performed, which is not limited in embodiments of the present disclosure.

Better performance may include better articulation in voice communication and/or a smaller packet loss rate. Performance of service provided through the mobile communication network varies continuously, for example, at different time points or in different places. The performance of service provided through the mobile communication network is superior to performance of service provided through other networks sometimes, while being worse than the performance of service provided through other networks in other times. In some embodiments, it is required to determine whether the performance of the second subscriber card providing the first type of service through the first network is better than the performance of the second subscriber card providing the first type of service through the second network.

In S106, the second subscriber card is controlled to provide the first type of service through the first network.

If it is detected that the first network currently supports providing the first type of service for a plurality of subscriber cards at the same time (refer to S102), it is detected that the second subscriber card needs to provide the first type of service (refer to S104), and it is determined that the performance of the second subscriber card providing the first type of service through the first network is better than the performance of the second subscriber card providing the first type of service through the second network (refer to S105), the second subscriber card is controlled to provide the first type of service through the first network, so that the second subscriber card borrows the first network to provide better service to users.

The "borrowing" procedure lasts until the first network currently does not support providing the first type of service for a plurality of subscriber cards at the same time. Besides, if the second subscriber card does not need to provide the first type of service subsequently, the "borrowing" procedure may also be terminated.

It should be noted that, the above process is described with respect to one "borrowing" procedure. It could be understood that, multiple "borrowing" procedures can occur at the same time. For example, a subscriber card A "borrows" a network B corresponding to a subscriber card B to provide voice service, and the subscriber card B "borrows" a network C corresponding to a subscriber card C to provide voice service at the same time, that is, two (or more than two) "borrowing" procedures may occur at the same time. During a procedure that the subscriber card A "borrows" the network B corresponding to the subscriber card B to provide voice service, the subscriber card B serves as the first subscriber card in S101 to S106, and the subscriber card A serves as the second subscriber card in S101 to S106. During a procedure that the subscriber card B "borrows" the network C corresponding to the subscriber card C to provide voice service, the subscriber card C serves as the first subscriber card in S101 to S106, and the subscriber card B serves as the second subscriber card in S101 to S106.

From above, in embodiments of the present disclosure, if it is detected that the first network currently supports providing a first type of service for a plurality of subscriber cards at the same time, other subscriber card except the first subscriber card is notified to allow the other subscriber card to provide the first type of service through the first network. If the other subscriber card (such as the second subscriber card) needs to provide the first type of service subsequently, and performance of the second subscriber card providing the first type of service through the first network is better than performance of the second subscriber card providing the first type of service through the second network, the second subscriber card is controlled to provide the first type of service through the first network. In this way, better service may be provided to the other subscriber card nearly without increase in cost.

As described in the background, performance of service provided by accessing a network through a mobile communication network is always superior to performance of service provided by accessing a network through other networks. For example, when an LTE network is accessed, voice service is provided through VoLTE; and when a WiFi network is accessed, voice service is provided through VoWiFi, where performance of the former is usually better than that of the latter. However, to the way of accessing a network through a mobile communication network, the performance may be affected by factors, such as signal strength (not limited to signal strength). For example, when the user terminal is located in a remote mountainous area which has relatively narrow mobile communication coverage, service performance of the way of accessing a network through a mobile communication network may be relatively poor. Therefore, in such environment where mobile communication coverage is relatively narrow, service provided by accessing the network through the mobile communication network may have worse performance than similar service provided by accessing the network through other networks.

In embodiments of the present disclosure, a subscriber card may borrow a network which corresponds to another subscriber card in an initial state, so that each subscriber card can provide service to users with relatively good performance in a situation that signal quality varies continuously. For example, when signal quality of the mobile communication network is relatively good, other subscriber card which provides service through other network initially is switched to the mobile communication network to provide service (the switch can be implemented without interruption of service). When signal quality of the mobile communication network is relatively poor, the subscriber card which provides service through the mobile communication network initially is switched to the other network to provide service. In this way, better service may be provided by each subscriber card nearly without increase in cost.

In an embodiment of the present disclosure, a device for providing mobile communication service is provided.

Figure 2:
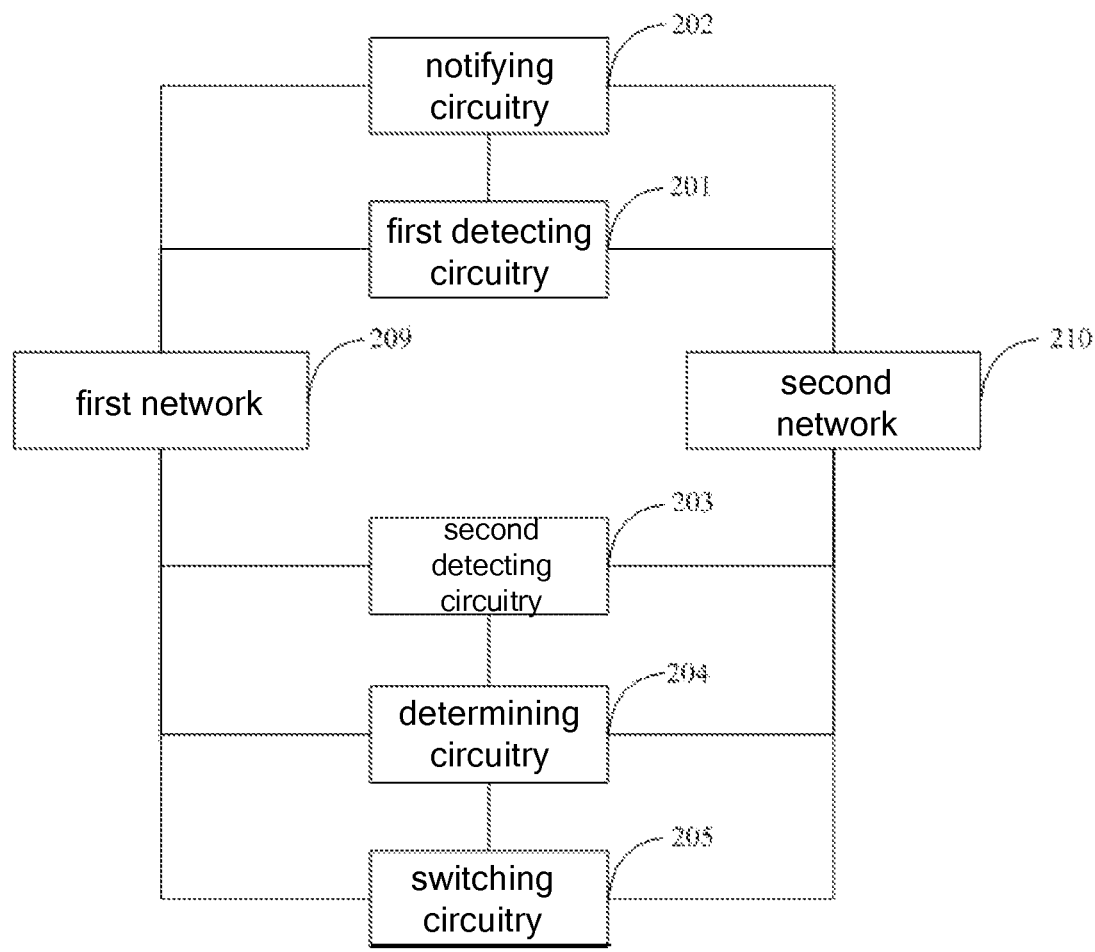
FIG. 2 schematically illustrates a structural diagram of a device for providing mobile communication service according to an embodiment.

FIG. 2 schematically illustrates a structural diagram of the device for providing mobile communication service.

The device for providing mobile communication service includes a first detecting circuitry 201, a notifying circuitry 202, a second detecting circuitry 203, a determining circuitry 204 and a switching circuitry 205. Functions of these circuitries are described in detail below.

A first subscriber card provides service through a first network 209, and a second subscriber card provides service through a second network 210, where the first network 209 operates based on a protocol of a mobile communication network and the second network 210 operates based on a protocol of other network, or the first network 209 operates based on a protocol of the other network and the second network 210 operates based on a protocol of the mobile communication network.

The first detecting circuitry 201 is configured to detect whether the first network 209 currently supports providing a first type of service for a plurality of subscriber cards at the same time; the notifying circuitry 202 is configured to: if the first detecting circuitry 201 detects that the first network 209 currently supports providing the first type of service for a plurality of subscriber cards at the same time, notify other subscriber card except the first subscriber card to allow the other subscriber card to provide the first type of service through the first network 209; the second detecting circuitry 203 is configured to detect whether the second subscriber card needs to provide the first type of service; the determining circuitry 204 is configured to: after the second detecting circuitry 203 detects that the second subscriber card needs to provide the first type of service, determine whether performance of the second subscriber card providing the first type of service through the first network 209 is better than performance of the second subscriber card providing the first type of service through the second network 210, or whether the second subscriber card is unable to provide the first type of service through the second network 210; and the switching circuitry 205 is configured to: after the determining circuitry 204 determines that the performance of the second subscriber card providing the first type of service through the first network 209 is better than the performance of the second subscriber card providing the first type of service through the second network 210, or that the second subscriber card is unable to provide the first type of service through the second network 210, control the second subscriber card to provide the first type of service through the first network 209.

In embodiments of the present disclosure, if it is detected that the first network currently supports providing a first type of service for a plurality of subscriber cards at the same time, other subscriber card except the first subscriber card is notified to allow the other subscriber card to provide the first type of service through the first network. If the other subscriber card (such as the second subscriber card) needs to provide the first type of service subsequently, and performance of the second subscriber card providing the first type of service through the first network is better than performance of the second subscriber card providing the first type of service through the second network, the second subscriber card is controlled to provide the first type of service through the first network. In this way, better service may be provided to the other subscriber card nearly without increase in cost. Particularly in situations where signal quality of mobile communication network varies continuously, and each subscriber card switches between the mobile communication network and the other network, service may be provided to users in a way with relatively good performance.

In some embodiments, the switching circuitry 205 may be further configured to: if the first detecting circuitry 201 detects that the first network 209 currently does not support providing the first type of service for a plurality of subscriber cards at the same time, control the second subscriber card to provide the first type of service through the second network 210.

In some embodiments, the notifying circuitry 202 may be further configured to: if the first detecting circuitry 201 detects that the first network 209 currently does not support providing the first type of service for a plurality of subscriber cards at the same time, notify the other subscriber card except the first subscriber card to forbid the other subscriber card to provide the first type of service through the first network 209.

By the above embodiments, if it is detected that the first network currently does not support providing the first type of service for a plurality of subscriber cards at the same time, the second subscriber card is controlled to provide the first type of service through the second network, and/or the other subscriber card except the first subscriber card is notified to forbid the other subscriber card to provide the first type of service through the first network, so as to avoid influence on normal use for the first subscriber card corresponding to the first network caused by borrowing of the first network by the other subscriber card.

In some embodiments, a user terminal may support simultaneous use of at least two subscriber cards.

In some embodiments, the first type of service may be voice service or video service.

In some embodiments, the first network 209 may operates based on a protocol of LTE network and the second network 210 may operate based on a protocol of WiFi network, or the first network 209 may operate based on a protocol of WiFi network and the second network 210 may operate based on a protocol of LTE network.

In an embodiment of the present disclosure, a user terminal which supports simultaneous use of at least two subscriber cards is provided.

Different from the existing techniques, the user terminal may further include the device for providing mobile communication service provided in the above embodiments. Therefore, during a process for providing mobile communication service to users, if it is detected that the first network currently supports providing a first type of service for a plurality of subscriber cards at the same time, the user terminal may notify other subscriber card except the first subscriber card to allow the other subscriber card to provide the first type of service through the first network. If other subscriber card (such as the second subscriber card) needs to provide the first type of service subsequently, and performance of the second subscriber card providing the first type of service through the first network is better than performance of the second subscriber card providing the first type of service through the second network, the user terminal controls the second subscriber card to provide the first type of service through the first network. In this way, better service may be provided to the other subscriber card nearly without increase in cost. Particularly in situations where signal quality of mobile communication network varies continuously, and each subscriber card switches between the mobile communication network and the other network, service may be provided to users in a way with relatively good performance.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for providing mobile communication service, comprising:
performing service providing, at a first subscriber card, through a first network, and performing service providing, at a second subscriber card, through a second network, where the first network operates based on a protocol of a mobile communication network and the second network operates based on a protocol of other network, or the first network operates based on a protocol of the other network and the second network operates based on a protocol of the mobile communication network;
if it is detected that the first network currently supports providing a first type of service for a plurality of subscriber cards at the same time, notifying the plurality of subscriber cards except the first subscriber card to allow the plurality of subscriber cards to provide the first type of service through the first network, wherein the plurality of subscriber cards are located in a same user terminal and comprise the first subscriber card and the second subscriber card, and the first type of service is voice service or video service; and
if it is detected that the second subscriber card needs to provide the first type of service, and if performance of the second subscriber card providing the first type of service through the first network is better than performance of the second subscriber card providing the first type of service through the second network, or the second subscriber card is currently unable to provide the first type of service through the second network, controlling the second subscriber card to provide the first type of service through the first network.

2. The method according to claim 1, wherein after the second subscriber card provides the first type of service through the first network, the method further comprises:
detecting that the first network currently does not support providing the first type of service for the plurality of subscriber cards at the same time; and
controlling the second subscriber card to provide the first type of service through the second network.

3. The method according to claim 1, wherein after allowing the plurality of subscriber cards to provide the first type of service through the first network, the method further comprises:
if it is detected that the first network currently does not support providing the first type of service for the plurality of subscriber cards at the same time, notifying the plurality of subscriber cards except the first subscriber card to forbid the plurality of subscriber cards except the first subscriber card to provide the first type of service through the first network.

4. The method according to claim 1, wherein the user terminal supports simultaneous use of at least two subscriber cards.

5. The method according to claim 1, wherein the first network operates based on a protocol of Long Term Evolution (LTE) network and the second network operates based on a protocol of WiFi network, or the first network operates based on a protocol of WiFi network and the second network operates based on a protocol of LTE network.

6. A device for providing mobile communication service, comprising a first detecting circuitry, a notifying circuitry, a second detecting circuitry, a determining circuitry and a switching circuitry,
wherein a first subscriber card performs service providing through a first network, and a second subscriber card performs service providing through a second network, where the first network operates based on a protocol of a mobile communication network and the second network operates based on a protocol of other network, or the first network operates based on a protocol of the other network and the second network operates based on a protocol of the mobile communication network;
wherein the first detecting circuitry is configured to detect whether the first network currently supports providing a first type of service for a plurality of subscriber cards at the same time, wherein the plurality of subscriber cards are located in a same user terminal and comprise the first subscriber card and the second subscriber card, and the first type of service is voice service or video service;
the notifying circuitry is configured to: if the first detecting circuitry detects that the first network currently supports providing the first type of service for the plurality of subscriber cards at the same time, notify the plurality of subscriber cards except the first subscriber card to allow the plurality of subscriber cards to provide the first type of service through the first network;
the second detecting circuitry is configured to detect whether the second subscriber card needs to provide the first type of service;
the determining circuitry is configured to: after the second detecting circuitry detects that the second subscriber card needs to provide the first type of service, determine whether performance of the second subscriber card providing the first type of service through the first network is better than performance of the second subscriber card providing the first type of service through the second network, or whether the second subscriber card is unable to provide the first type of service through the second network; and
the switching circuitry is configured to: after the determining circuitry determines that the performance of the second subscriber card providing the first type of service through the first network is better than the performance of the second subscriber card providing the first type of service through the second network, or that the second subscriber card is unable to provide the first type of service through the second network, control the second subscriber card to provide the first type of service through the first network.

7. The device according to claim 6, wherein the switching circuitry is further configured to:
if the first detecting circuitry detects that the first network currently does not support providing the first type of service for the plurality of subscriber cards at the same time, control the second subscriber card to provide the first type of service through the second network.

8. The device according to claim 6, wherein the notifying circuitry is further configured to:
if the first detecting circuitry detects that the first network currently does not support providing the first type of service for the plurality of subscriber cards at the same time, notify the plurality of subscriber cards except the first subscriber card to forbid the plurality of subscriber cards except the first subscriber card to provide the first type of service through the first network.

9. The device according to claim 6, wherein the user terminal supports simultaneous use of at least two subscriber cards.

10. The device according to claim 6, wherein the first network operates based on a protocol of Long Term Evolution (LTE) network and the second network operates based on a protocol of WiFi network, or the first network operates based on a protocol of WiFi network and the second network operates based on a protocol of LTE network.

11. A user terminal comprising a device for providing mobile communication service which comprises a first detecting circuitry, a notifying circuitry, a second detecting circuitry, a determining circuitry and a switching circuitry, wherein a plurality of subscriber cards comprising a first subscriber card and a second subscriber card are located in the user terminal,
wherein the first subscriber card performs service providing through a first network, and the second subscriber card performs service providing through a second network, where the first network operates based on a protocol of a mobile communication network and the second network operates based on a protocol of other network, or the first network operates based on a protocol of the other network and the second network operates based on a protocol of the mobile communication network;
wherein the first detecting circuitry is configured to detect whether the first network currently supports providing a first type of service for the plurality of subscriber cards at the same time, wherein the first type of service is voice service or video service;
the notifying circuitry is configured to: if the first detecting circuitry detects that the first network currently supports providing the first type of service for the plurality of subscriber cards at the same time, notify the plurality of subscriber cards except the first subscriber card to allow the plurality of subscriber cards to provide the first type of service through the first network;
the second detecting circuitry is configured to detect whether the second subscriber card needs to provide the first type of service;
the determining circuitry is configured to: after the second detecting circuitry detects that the second subscriber card needs to provide the first type of service, determine whether performance of the second subscriber card providing the first type of service through the first network is better than performance of the second subscriber card providing the first type of service through the second network, or whether the second subscriber card is unable to provide the first type of service through the second network; and
the switching circuitry is configured to: after the determining circuitry determines that the performance of the second subscriber card providing the first type of service through the first network is better than the performance of the second subscriber card providing the first type of service through the second network, or that the second subscriber card is unable to provide the first type of service through the second network, control the second subscriber card to provide the first type of service through the first network.

12. The user terminal according to claim 11, wherein the switching circuitry is further configured to:
if the first detecting circuitry detects that the first network currently does not support providing the first type of service for the plurality of subscriber cards at the same time, control the second subscriber card to provide the first type of service through the second network.

13. The user terminal according to claim 11, wherein the notifying circuitry is further configured to:
if the first detecting circuitry detects that the first network currently does not support providing the first type of service for the plurality of subscriber cards at the same time, notify the plurality of subscriber cards except the first subscriber card to forbid the plurality of subscriber cards except the first subscriber card to provide the first type of service through the first network.

14. The user terminal according to claim 11, wherein the user terminal supports simultaneous use of at least two subscriber cards.

15. The user terminal according to claim 11, wherein the first network operates based on a protocol of Long Term Evolution (LTE) network and the second network operates based on a protocol of WiFi network, or the first network operates based on a protocol of WiFi network and the second network operates based on a protocol of LTE network.

* * * * *